United States Patent [19]
Baird et al.

[11] 3,870,610
[45] Mar. 11, 1975

[54] COLD PLASMA TREATMENT OF MATERIALS

[75] Inventors: Richard W. Baird; William G. Baird, Jr., both of Spartanburg, S.C.

[73] Assignee: W. R. Grace and Co., Duncan, S.C.

[22] Filed: Feb. 27, 1973

[21] Appl. No.: 336,287

Related U.S. Application Data

[63] Continuation-in-part of Ser. No. 233,278, March 9, 1972, abandoned.

[52] U.S. Cl. ................ 204/165, 204/168, 250/547
[51] Int. Cl. ........................ C08f 47/22, H01t 19/00
[58] Field of Search ............................ 204/165, 168

[56] References Cited
UNITED STATES PATENTS

| | | | |
|---|---|---|---|
| 3,309,299 | 3/1967 | Mantell | 204/165 |
| 3,376,208 | 4/1968 | Wood | 204/168 |
| 3,462,335 | 8/1969 | Hansen et al. | 204/168 X |
| 3,503,859 | 3/1970 | Goncarovs et al. | 204/165 |
| 3,526,583 | 9/1970 | Hayward | 204/165 |
| 3,632,299 | 1/1972 | Thorsen | 8/128 |

*Primary Examiner*—F. C. Edmundson
*Attorney, Agent, or Firm*—John J. Toney; William D. Lee, Jr.

[57] ABSTRACT

A low temperature plasma is used to treat the surfaces of polymeric materials and textile fibers to improve their useful properties. For example, plastic film surfaces show greatly improved wettability and ink adhesion after treatment and textile fibers such as wool yarn show a reduction in shrinkage. The low temperature or "cold" plasma can be produced with various gases including air at low pressures with excitation produced by an alternating field oscillating in the radiofrequency range.

9 Claims, 1 Drawing Figure

COLD PLASMA TREATMENT OF MATERIALS

CROSS-REFERENCE TO RELATED APPLICATION

This application is a continuation in part of our earlier application entitled "COLD PLASMA TREATMENT OF PLASTIC FILMS" filed Mar. 9, 1972 and having Ser. No. 233,278, now abandoned.

FIELD OF THE INVENTION

This invention relates to the treatment of materials by a cold or low temperature plasma comprising electrons and gas molecules. Particularly, the invention relates to the surface treatment of polymers to improve their wettability and ink adhesion and to the treatment of textile fibers such as wool to improve its shrinkage characteristics.

BACKGROUND

Introduction

Many materials such as the polymer plastics and the textile fibers have clearly demonstrated their usefulness. However, many of these materials have only limited utility without further treatment. For example, polyethylene is strong, water resistant, and flexible; but, without further surface treatment it can not be commercially printed as the ink will not adhere satisfactorily to the surface.

In the past, surface treatment of a polymer film to improve its ink adhesion and wettability has been accomplished through methods such as chemical treatment, flame exposure, beta-particle or gamma-ray bombardment, electrical corona exposure, glow discharge exposure, or cold plasma exposure. The cold plasma approach has several advantages over the other methods, namely: there is flexability in choosing the interacting medium; a high degree of control over the conditions of the system can be exercised; and, the treatment time is relatively short. Furthermore, the cold plasma treatment has a higher degree of safety than other techniques since chemical treatment usually involves strong acids or bases; flame treatment presents a heat problem; high energy radiation requires heavy shielding around the work area; and electrical corona requires electrode potentials of several kilovolts. Most of these problems are absent with cold or low temperature plasmas; e.g. voltages are low, the radiation is negligible, and at the low operating pressure involved heat is not a major factor. In addition, the use of strong, corrosive chemicals is avoided.

Definitions

A cold plasma can be defined as: "A discharge having a high electron temperature and a low gas temperature, a nonequilibrium system." The non-equilibrium condition can be explained by considering the mode of excitation. For example, when high frequency alternating current imposes polarity reversals upon the plasma particles in the order of several million times per second the particles are alternately accelerated thereby greatly increasing the probability of particle collision. The collisions are sufficiently strong to ionize and dissociate the gas molecules and thereby produce a plasma which comprises chemically active ions, radical species, and free electrons.

In a cold or low temperature plasma the pressure must be low, of the order of less than 100 torr, making possible a relatively large mean free path for the electrons produced by the excitation. As used herein, the unit, "torr" is equivalaent to one millimeter of Mercury (1 mm. Hg.). Since electrons are lighter and far more mobile than the considerably heavier gas ions, energy is more readily and selectively imparted to the electrons. Thus, in a cold plasma the gas temperature will be or the order of several hundred degrees Kelvin while the electron energy will correspond to a temperature of several thousand degrees Kelvin. Since this represents a low energy density when compared to "hot" plasmas such as those produced in an electric arc, the term "cold plasma" is applied. Another synonymous term is: "glow discharge."

The cold plasmas herein are generated at radiofrequencies which include the wave frequencies just beyond audible frequencies and range from 15 thousand cycles per second up to and beyond 30 million cycles per second. This is sometimes referred to as the Kilocycle and Megacycle range. Since waves at radiofrequencies have classically been known as Hertzian waves the term "Hertz" has been adopted to be equivalent to one cycle. Thus, as used herein, the term "MHz" means a Megahertz or one million cycles.

Prior Art

In an article by J. R. Hollahan appearing in the *Journal of Scientific instruments*, 1969, Series 2, volume at pages 203 to 205 and entitled "Radio-Frequency Plasma Reactor For Polymer Surface Treatment," a method of reacting partially ionized gases with the surface of polymer substrates is described. The polymeric sample is placed in an evacuated central reactor chamber into which several smaller side tubes enter. The side tubes are sandwiched between capacitive exciter plates and a gas is fed through the tubes between the plates and into the reactor chamber. In this arrangement, the excited species are created indirectly and float downstream to the sample surface. On page 204 of the aforementioned article, it is stated that "in many previous attempts to investigate capacitive or inductive excitation directly at the surface, the discharge power and the r.f. heating were too severe for low temperature polymers, resulting in compromise of the bulk polymer characteristics." Therefore, one object of the present invention is to overcome the prior art deficiency of inability to treat directly a polymeric surface by providing in the present invention a method and apparatus for treating a polymeric surface directly with a cold plasma and doing so continuously.

Other prior art which is not as pertinent to the present invention as that mentioned in the foregoing paragraph includes U.S. Pat. No. 3,387,991 issued to Michael Erchak, Jr. on June 11, 1968; U.S. Pat. No. 3,069,283 issued to J. H. Coleman on Dec. 18, 1962; and an article by H. E. Wechsberg and J. B. Webber appearing in the July, 1959 issue of *Modern Plastics* magazine at pages 101 – 109 and entitled "Surface Treatment of PE Film By Electrical Discharge." However, each of these references employ electrodes to create an electrical discharge and rely upon chemical reactions or coatings on the surface which have a tendency to show up not only on the film surface but within the surface. In some instances, "treat-through" occurs so that a relatively thin film will be treated completely through its thickness and on both surfaces. Therefore, it is another object of the present invention to avoid "treat-through" in preparing a polymeric film for printing.

Additional prior art patents are U.S. Pat. Nos. 3,309,299 and 3,526,583 both of which disclose methods of treating polymeric material with activated ion species at a location remote from the discharge which creates the species. These prior art methods require auxiliary apparatus to transport the activated species from their point of creation to the film to be treated. Therefore, another object of the present invention is to eliminate the necessity of transporting ionized species from their point of origin and to expose the material to be treated directly to a cold plasma.

Still other advantages of the present invention are the use of a low-pressure, low-temperature cold plasma which requires relatively low power and low voltages, which is quite stable, and which is adaptable to differing geometries. These and other aadvantages will become apparent from the following description of the invention.

SUMMARY OF THE INVENTION

In one aspect, the present invention is a process for treating polymeric materials and textile fibers and comprises the steps of at least partially evacuating a confined region; creating a low temperature plasma within the region; and, thereafter, exposing at least one side of said material directly to said plasma within said region. In another aspect, the invention includes the formation of a cold or low temperature plasma within air, helium, or other ionizing medium and also includes the excitation of the gas molecules or ions and electrons by polarity reversals at radiofrequencies. In still another aspect, the present invention includes evacuating the confined region to less than 100 torr and further includes the treatment of polymeric film such as polyethylene and the treatment of textile fibers such as wool yarn. An additional aspect of the process of the present invention provides for continuous treatment of plastic film by providing vacuum traps to permit the entry and exit of continuous lengths of film.

The apparatus of the present invention in one aspect comprises a chamber or confined region, means for evacuating the chamber, means for creating a cold plasma within said chamber, and means for exposing plastic film and textile fibers to said plasma. In another aspect, the apparatus of the present invention includes capacitative plate means and means for producing polarity reversals between said plate means in the radiofrequency range. Also within the scope of the invention are vacuum trap means for allowing the entry and exit of continuous lengths of material without affecting the vacuum created within said chamber.

Furthermore, the present invention includes the product which is treated by the process of the present invention.

As used in connection with the present invention, "polymer" and "polymeric" include the polymers, copolymers, homopolymers, block, and graft polymers of the material referred to.

PREFERRED EMBODIMENT

Figure 1:
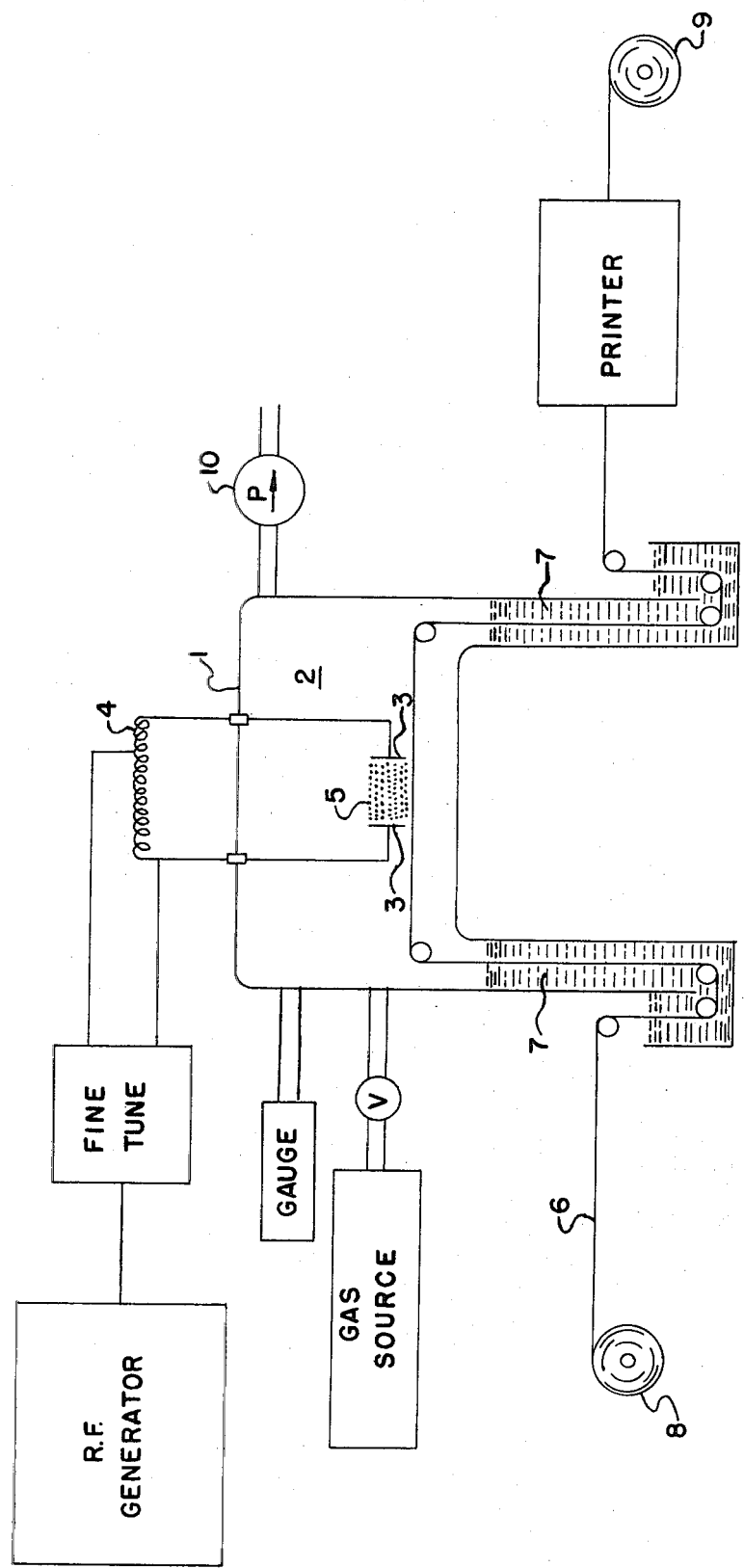
FIG. 1 is a schematic representation of the apparatus of the present invention showing one embodiment of a continuous method for treating material.

Referring to FIG. 1 of the drawings, apparatus 1 having a confined region 2 which can be evacuated by pump 10 is shown. Inside evacuated chamber 2 capacitor plates 3 are shown spaced apart and perpendicular to the strip of film 6 which passes through chamber 2 and is seen edgewise in FIG. 1. The capacitor plates are energized by the radiofrequency generator (R. F. Generator) through a fine tuner or antenna matcher. To further aid in tuning the capacity load to the transmitter frequency tapped inductance coil 4 is connected across the plates.

In operation, chamber 2 is evacuated to a low vacuum, preferably less than 100 torr, after film 6 from roll 8 has been threaded through the vacuum traps 7 and out to the printer. As the chamber 2 is evacuated the liquid in the vacuum trap will rise on the chamber side. The liquid may be any suitable inert liquid.

The preferable atmosphere within the chamber 2 is the residual low pressure normal air; but, if another atmosphere is desired, gas can be introduced from the gas source through valve V. To continuously treat a thermoplastic film surface such as polyethylene, the film 6 from the roll 8 goes through the chamber 2 where it is subjected to treatment by the established plasma 5. After being treated the film leaves the evacuated region 2 through the righthand trap 7 and thereafter goes to printer 9 where labels, indicia, etc are printed onto the film before it is wound into roll 9.

To establish the plasma 5, excitation at radiofrequency levels appears to be the most efficient and economical. Preferably the R. F. Generator is a crystal-tuned unit and the high frequency current is carried through coaxial lines from the R. F. Generator and fine tuner to the plates 3. A preferred frequency is about 13.5 MHz and plate voltage difference is about 240 volts at a current of 125 milliamps. The output impedance, usually in the range of 50 ohms, is matched to that of the gas load which is dependent on pressure, flow rate, and composition of the work gas and is usually of the order of $10^4$ ohms. When the resonance of the generator and the capacitor plates 3 is in line, the gas, normally air, in the evacuated region 2 will ionize and become inductive as the alternating field oscillation causes rapidly alternating particle accelerations within the gas. Collision rates drastically increase and the result of these elastic particle collisions is an increasing free-electron population. At about one percent ionization, an equilibrium state is achieved as electrons enter and leave the free state an equal proportions. In the pressure range of approximately 20 to 100 torr the ion concentration in the cold plasma will be of the order of $10^{11}$ ions/cm.$^3$.

Chemically, the established cold plasma is highly reactive as the dissociation and ionization result in the formation of a wide variety of free-radical species. The number and variety is simply a function of the initial gas composition. Thus, an ideal chemical environment for otherwise difficult or impossible reactions with thermally unstable chemical systems is achieved.

What happens chemically can be several different things. Oxidation of functional groups on the polymer chain can occur in air, $CO_2$ or similar plasmas. Activated $O_2$ and O(nascent oxygen) readily attack the polymer surface, once having been excited by the radiofrequency environment. Cross-linking can occur when an inert gas atom knocks off a hydrogen or an OH group, causing a double bond to show up in a monomer. To reach a lower energy bond state, this bond branches over and cross-links to an adjaacent polymer chain. This is CASING or "cross-linking by activated species of inert gases." Molecular sand blasting of this sort can also change the nature of the functional groups or rearrange them on the polymer chain. Molecular grafting can occur in a non-inert activated plasma. $NH_2^-$, $NH_4^+$, $CH_2-$, $OH-$, and other radicals present in the plasma can latch onto the polymer chain as new molecular grafts again changing the chemical characteristics of the polymer involved. In some mixed plasmas, any combination of these effects can show up on the polymer surface. In any case, however, the affected region of the polymer is only several molecular layers thick, making analysis exceedingly difficult, if not impossible. Thus, descriptions of the surface composition are, at best, speculative.

EXAMPLES 1 – 4

Radiofrequency excitation on the 13.5 MHz International, Scientific, and Medical band was chosen because a license is not required to operate at that frequency and because that band is near the 14 MHz amateur radio band and a standard ham transmitter can be crystal adapted for generation at 13.6 MHz. A Johnson-Viking II transmitter was used which furnished 30 to 35 watts to the capacity plates. Experimentation with an inductance coil to excite the plasma were not successful but capacitatives plates were. The plates used were highly polished aluminum, rectangular in shape measuring 7.5 cm by 20 cm. The plates were spaced at about 2.5 cm apart.

Tuning the capacitor load to the transmitter frequency was accomplished by using a 7.5 cm diameter inductance coil with ten turns and tapping it at about the fourth turn. A standard antenna matcher did the fine tuning and often had to be re-set with each new run.

The plates were placed in a typical laboratory reaction vessel fitted with the ground glass cap with openings for the plate leads, a McLeod gauge outlet, a pump outlet, and a gas inlet.

The evacuation of the vessel was accomplished by a standard laboratory mechanical pump and the McLeod gauge gave pressure readings. The examples were carried out at a pressure of 4 to 6 torr. The specimens to be exposed to the plasma were tacked onto nylon plate spacers giving a 3 cm by 15 cm treated area. The surface of each specimen was perpendicular to the plates.

Sample runs were done for different exposure times ranging from a fraction of a second to 8 minutes. For runs using an air plasma the chamber was simply evacuated to the 4 to 6 torr pressure level and a plasma struck immediately upon reaching this pressure. With helium the chamber was flushed for about 15 to 20 seconds at room pressure and then evacuated to test pressure. Upon reaching test pressure it was repressurized with helium once more and again evacuated to 4 to 6 torr. These helium purges insured at least a temporary atmosphere of almost pure helium. Tests were then done immediately to lessen the risk of a leakage that would contaminate the atmosphere.

One difficulty was in the tuning of the plasma and on each different run a new dial setting on the antenna matcher had to be found. However, once tuned the plasma was exceedingly stable and uniform and the test results were regular. The plasma glow is caused when excited species return to their ground state energy thereby emitting light on a wave length dependent upon the gas species involved. In structure, cold plasmas generated at radio frequencies differ from the classic Crookes tube arrangement because of the polarity reversals involved. In theory, one should probably obtain the cathode glow, the Crookes dark space, the negative glow, the Faraday dark space, the positive column and anode glow series in somewhat that order. In practice, this appears to the naked eye as two bright regions hovering above the capacitative plates. In the central region the bright regions taper off to about 30% of their highest intensity.

Three methods were employed for sample testing. The standard McLaughlin tilt-angle test where the sample is rotated until a standard water drop rolls off proved adequate only in indicating water adhesion. Wettability was determined by measuring the spread area for a McLaughlin test drop and comparing this test area to that for an untreated sample. Both of these tests were required to give the full picture of the effects of plasma treatment. In both, three trials were performed for each sample side and averaged. Ink adhesion on polyethylene, which in raw form is unprintable, was gauged by the "Scotch" tape test. Here, the inked sample was dried, and then a piece of Scotch tape was pressed onto its surface and quickly ripped off. The amount of ink showing on the tape reveals the extent of ink adhesion, i.e., the amount of ink removed in the area covered by the tape is visually estimated to arrive at the percentage of ink adhesion.

In the McLaughlin tilt-angle test, the treated sample is placed on a tilt platform and a standard drop of distilled water is dropped thereupon. The platform is slowly rotated until the drop shows bare roll off tendency. The angle, $\theta$, that the platform makes with the horizontal is recorded and this is taken as the tilt-angle thus indicating water adhesion to the surface.

Samples of polyethylene, polypropylene, Mylar (polyethylene Terephthalate), and Nylon (polyamide) were treated by a plasma and are respectively identified as Examples 1 – 4. In Table I below the results of the McLaughlin tilt-angle test are given for treatment times up to eight minutes. In Examples 1 – 3, the respective samples were treated both by air and by helium plasmas. Table I shows that generally with treatments of 15 seconds or less the treated side of the sample, i.e., the side exposed to the plasma, has a significantly increased tilt-angle for polyethylene and polypropylene (Examples 1 and 2) while this type of change is not noted in either the Mylar or Nylon (Examples 3 and 4).

TABLE I (McLAUGHLIN TILT-ANGLE RESULTS)
T = Treated Side of Sample
U = Untreated Side of Sample

| | (1) | | | | (2) | | | | (3) | | | | (4) | |
|---|---|---|---|---|---|---|---|---|---|---|---|---|---|---|
| TREAT | POLYETHYLENE | | | | POLYPROPYLENE | | | | MYLAR | | | | NYLON | |
| TIME | AIR | | HE | | AIR | | HE | | AIR | | HE | | AIR | |
| | T | U | T | U | T | U | T | U | T | U | T | U | T | U |
| 0 sec. | 23° | 23° | — | — | — | — | — | — | — | 34° | — | — | 44° | 42° |
| <1 sec. | 53° | 24° | 50° | 25° | 43° | 24° | 27° | 22° | 32° | 33° | 39° | 34° | 44° | 43° |
| 1 sec. | 57° | 25° | 45° | 22° | 57° | 28° | 55° | 23° | 33° | 36° | 32° | 40° | 36° | 47° |
| 2 sec. | — | — | — | — | — | — | — | — | 26° | 37° | 26° | 37° | — | — |
| 4 sec. | — | — | — | — | 45° | 20° | — | — | 22° | 38° | — | — | — | — |
| 15 sec. | 39° | 26° | 38° | 27° | 28° | 26° | 28° | 25° | 21° | 37° | — | — | 26° | 42° |
| 30 sec | — | — | — | — | 35° | 25° | — | — | — | — | — | — | — | — |
| 60 sec. | 29° | 25° | 34° | 44° | 23° | 31° | 25° | 24° | 21° | 33° | 17° | 39° | 18° | 46° |
| 2 min. | 33° | 34° | 33° | 40° | 15° | 38° | — | — | — | — | — | — | 20° | 47° |
| 3 min. | 35° | 50° | — | — | — | — | — | — | — | — | — | — | — | — |
| 4 min. | 37° | 70° | 33° | 36° | 20° | 48° | 28° | 34° | 17° | 32° | 13° | 37° | 25° | 45° |
| 8 min. | — | — | — | — | — | — | — | — | — | — | — | — | 30° | 36° |
| BLANK | 24° | 26° | | | 24° | 21° | | | 37° | 35° | | | 35° | 43° |

Table II shows the results for examples 1 – 4 for the drop area test. This is a measure of the spread area for a test drop and is a measure of wettability of the surface. In all of the examples, improvement is shown up to a treatment time of about 15 seconds, but after the wettability does not improve with increased exposure time.

which is flat and spread out will not show the same tendency to roll from a surface as a nearly spherical drop will show. Therefore, the results in Table II give a more accurate picture of the true nature of the treated surface.

The phenomenon of "treat-through" which is common in most plastic film surface treatment is clearly ab-

TABLE II

RATIO OF DROP AREA ON SAMPLE FOR McLAUGHLIN TESTS
DROP AREA ON BLANK

| | (1) | | | | (2) | | | | (3) | | | | (4) | |
|---|---|---|---|---|---|---|---|---|---|---|---|---|---|---|
| TREAT | POLYETHYLENE | | | | POLYPROPYLENE | | | | MYLAR | | | | NYLON | |
| TIME | AIR | | HE | | AIR | | HE | | AIR | | HE | | AIR | |
| | T | U | T | U | T | U | T | U | T | U | T | U | T | U |
| 0 sec. | 1.0 | 1.0 | — | — | — | — | — | — | 1.0 | 1.0 | — | — | 1.0 | 1.0 |
| <1 sec. | 1.8 | 1.0 | 1.5 | 1.0 | 1.5 | 1.0 | 1.1 | 1.0 | 2.0 | 1.0 | 1.8 | 1.0 | 1.5 | 1.0 |
| 1 sec. | 2.0 | 1.0 | 1.7 | 1.0 | 1.7 | 1.0 | 1.7 | 1.0 | 2.5 | 1.0 | 2.5 | 1.0 | 1.5 | 1.0 |
| 2 sec. | — | — | — | — | — | — | — | — | 2.7 | 1.0 | 2.7 | 1.2 | — | — |
| 4 sec. | — | — | — | — | 2.3 | 1.0 | — | — | 2.7 | 1.2 | — | — | — | — |
| 15 sec. | 2.5 | 1.1 | 2.5 | 1.0 | 2.5 | 1.0 | 2.8 | 1.0 | 3.0 | 1.5 | — | — | 2.7 | 1.0 |
| 30 sec. | — | — | — | — | 3.1 | 1.0 | — | — | — | — | — | — | — | — |
| 60 sec. | 3.0 | 1.2 | 2.5 | 1.3 | 3.5 | 1.2 | 2.8 | 1.2 | 3.0 | 1.5 | 3.0 | 1.5 | 2.2 | 1.2 |
| 2 min. | 3.0 | 1.5 | 2.5 | 1.3 | 4.5 | 1.2 | — | — | — | — | — | — | 2.3 | 1.5 |
| 3 min. | 3.0 | 1.5 | — | — | — | — | — | — | — | — | — | — | — | — |
| 4 min. | 3.0 | 1.5 | 2.7 | 1.3 | 5.0 | 1.2 | 5.0 | 1.2 | 3.5 | 1.7 | 3.5 | 1.5 | 2.0 | 1.5 |
| 8 min. | — | — | — | — | — | — | — | — | — | — | — | — | 2.1 | 1.7 |
| BLANK | 1.0 | 1.0 | | | 1.0 | 1.0 | | | 1.0 | 1.0 | | | 1.0 | 1.0 |

The ink adhesion test were performed only on polyethylene, the material used in Example 1. These results are set forth below in Table III. The improvement in ink adhesion between the treated and untreated surfaces is dramatically shown in this comparison and, again, after a treatment time of about 15 seconds, maximum ink adhesion appears to be obtained.

TABLE III

INK ADHESION TESTS ON POLYETHYLENE

| TREAT TIME | T | U |
|---|---|---|
| BLANK | 0% | 0% |
| <1 sec. | <20% | 0% |
| 1 sec. | 90 – 100% | <10% |
| 15 sec. | 100% | 10% |
| 60 sec. | 100% | <20% |
| 4 min. | 100% | 20% |

While the results in Table I seem to show in many cases less water adhesion as treatment time increased, the reverse of what was expected, the effect of the drop areas involved has not been accounted for. On the low angle results, the drop has spread out far more on the treated sample than on the blank untreated sample thus distorting the tilt-angle test. In other words, a drop sent in the plasma treated film since the test results are a comparison of the exposed side to the non-exposed side. Effects which show up on the unexposed film side after long exposure times are thought to be due to reflection and scattering within the vacuum chamber rather than "treat-through." Thus the low pressure, low temperature, radiofrequency generated cold plasma treatment increases both the wettability and printability of polymeric films.

EXAMPLE 5

In an air plasma as established in Examples 1 – 4 above, wool yarn samples were exposed for 30 seconds and for 2 minute intervals. When immersed in boiling water for up to 20 minutes, shrinkage in the treated samples was reduced approximately 70% to 75%.

Textile fibers such as wool yarn can be continuously treated by the method and apparatus represented in FIG. 1 by substituting continuous yarn for the film 6.

EXAMPLES 6 – 35

Using the apparatus described in Example 1 above, cold plasmas were produced with volatile organic liquids at pressures in the 5 to 12 torr range. A section of porous, absorbent paper was saturated with the liquid and then placed in the reactor vessel away from the capacitative plates. Evaporation at low pressure and the continued pump action effectively purged residual air from the new atmosphere and the effects and characteristics of the plasmas are summarized in the table below:

TABLE IV

| | NAME OF SUBSTANCE | % OF PLATES PLASMA COVERED RANGE | MINIMUM PRESSURE OF PLASMATORS | SPECIAL EFFECTS, PECULIARITIES, OBSERVATIONS |
|---|---|---|---|---|
| (6) | Ethanol, Denatured | 4–15% | 5.2 | Plasma electric blue in color; 7–8 distinct bands which fluctuate upon tuning. |
| (7) | ISO Propanol | 4–10% | 7.0 | Same plasma as denatured ethanol, with 8 bands. |
| (8) | 1-Butanol | 2–15% | 5.4 | Same as other alcohols, with hint of pink color as well. 5–8 bands seen. |
| (9) | Ethyl Acetate | <1–10% | 5.5 | Bluish like ethanol; blue violet at lowest plasma coverage. Plasma forms into 1-sq-cm cell according to coverage. |
| (10) | Perchlor-ethylene | 1%–5% | 7.0 | 10 bands; top & bottom pairs blue, center 6 are very bright, concentrated pink-white "soft", dim blue-violet phase at 5% coverage. Black, slimy ppt. produced (cedar odor) |
| (11) | Dodecanol | 5–50% | 5.8 | Rosy pink; little different from air (no evaporation??) |
| (12) | Benzene | 1–7% | 5.0 | Smooth & sky-blue; goes to violet near the 1% coverage. |
| (13) | Acetone | <1–10% | 6.0 | Doughnut-shaped soft outer zone; inner column lighter blue, with 6–8 bands. |
| (14) | Ethyl-ketone | 1–10% | 7.8 | Like acetone; "doughnut" outer section more like a double hat brim. |
| (15) | Chloroform | 1–3%; 10–70% "soft" phase | 6.0–8.0 | Like perchloroethylene; the "soft" phase blue-violet. Brownish ppt. produced; cedar smell like P.C.E. |
| (16) | Methanol | 1–10% | 8.0–9.0 | Typical alcohol configuration; a bit dimmer 7–11 bands. |
| (17) | Ethanol, Pure | 2–8% | 7.8 | Same as denatured; 7–11 bands |
| (18) | 1-Propanol | 2–10% | 6.0 | Like ISO form; 6–9 bands |
| (19) | 2-Propanol | 2–10% | 6.7 | Like ISO form; 6–9 bands |
| (20) | ISO-Butanol | 2–10% | 6.2 | Like Butanol in color; pink more pronounced at low coverage 6–8 bands |
| (21) | $NH_4OH$, 30% Aqueous SOL. | 2–15% (bands) to 30% (smooth) | 8.0–9.0 | Pink top & bottom; outer torus dark & an inner one salmon. Inner column, center, off-pink, yellow. Soft bands 6 to 8 or 10; none over 15% coverage. |
| (22) | Carbon Tetra-chloride | 4–6%; to 90% "soft" Stage | 7.0 | Like P.C.E., chloroform; at 4% only pinkish fuzz, however, and intense phase goes to 6%. "Soft" blue-violet dim phase. 6–8 middle bands 12 top & bottom, in intense phase, when seen. |
| (23) | Water (For reference) | 6–10% | 8.0–9.0 | Blue-violet top & bottom, soft pink in between. Faint dark regions in pink (8–10 lamellar areas) sometimes appear when plasma stable. |
| (24) | Air (For reference) | 5–100% | 2.5–4.0 | Pink, smooth. Top & bottom 2 or 3X more intense than middle. Same at all coverage levels. |
| (25) | Helium (For reference) | 5–100% | 4.5–5.0 | Little different from air-perhaps more salmon in color. |

TABLE IV – Continued

| NAME OF SUBSTANCE | | % OF PLATES PLASMA COVERED RANGE | MINIMUM PRESSURE OF PLASMATORS | SPECIAL EFFECTS. PECULIARITIES. OBSERVATIONS |
|---|---|---|---|---|
| (26) | Xylene | 2-7% | 5.6 | "Caps" on top & bottom whitish blue-violet & light blue beneath. They are surrounded with turquoise brims. Central column floats between caps, it is intense magenta top & bottom, dark middle. It surrounded by dark torus; torus has pink outer rim brown ppt., slow deposit, airplane-glue odor. |
| (27) | N-Pentane | 1–10% | 5.5 | Blue caps top & bottom with violet brims center light violet with 4 or 5 dark bands. Pentane very volattle. |
| (28) | Trichloro-ethylene | 2% | 7.8 | Like P.C.E., $CCL_4$ chloroform except that center has 10 pairs of alternating blue & orange band. offensive "Chlorine-sewage" odor |
| (29) | Decahydro-Napthalene | 3–8% | 6.6 | Very intense light-blue column with 15–20 "serrations" on edge. Burnt, solvent odor. |
| (30) | 2-Nitro-propane | 2–4% to 25% "soft" stage | 7.0 | Intense light blue; 3 or 4 concentric columns of lessening intensity (moving away from central one) Offensive, nauseating burnt odor & thin brown ppt. |
| (31) | Ethylene Gycol | 40–60% | 6.0 | No different from air (no evaporation??) |
| (32) | Toluene | ½–10% | 6.2 | Like benzene; with dark outer torus as well. At low coverage dim with 8–9 pink wavering bands pungent or menthol odor & thin straw-colored PPT |
| (33) | Methyl-cellosolu Acetate | 2–8% | 6.2 | Like an alcohol, except bluer. 7–9 band range and 9 at minimum coverage. Etherish odor produced. |
| (34) | Methylene Chloride | 1–2%; to 35% "soft" stage | 10–12.5 | Similar to P.C.E., $CCL_4$, other chlorinated plasmas (below 12 torr); >12 torr white center (smooth, orange rim) and blue caps. Violet "soft" phase. Smoke fumes produced; heavy grown PPT burnt odor & soot released. |
| (35) | Carbon Dioxide | 5–50% | 6.2 | Like air except alcohol-like blue in color |

The foregoing examples demonstrate that cold plasmas can be created in a multiplicity of atmospheres thereby producing ions or activated species as desired. Various materials can be exposed directly to such cold plasmas with resulting changes in the material's surface characteristics.

We claim:

1. A process for treating polymeric materials comprising the steps of:
   a. evacuating a confined region to a pressure less than 100 torr;
   b. creating and maintaining a cold plasma within said region, the ionized species comprising said plasma being created within said region and not being transported therefrom; and,
   c. exposing at least one side of said material directly to said plasma within said region.

2. The process of claim 1 wherein said plasma is formed in air.

3. The process of claim 1 wherein said plasma is formed in helium.

4. The process of claim 1 wherein said plasma is caused by excitation of the gas molecules and electrons by polarity reversals in the radiofrequency range.

5. The process of claim 1 wherein the polymeric material is selected from the group consisting of polymers of ethylene, propylene, ethylene terepthlate, and amides.

6. The process of claim 1 wherein said material is a continuous plastic film and including the steps of:

1. providing at least one vacuum trap for said region to permit said material to enter and exit said region; and,
2. continuously exposing at least one surface of said plastic film to said plasma.

7. The process of claim 6 wherein said plastic film is polyethylene.

8. A polymeric film having a modified surface which is substantially improved for adhesion to ink, said surface having been treated by the method of claim 1.

9. The polymeric film of claim 8 wherein only one side of said film is modified.

* * * * *